United States Patent
Small et al.

(10) Patent No.: US 7,502,841 B2
(45) Date of Patent: Mar. 10, 2009

(54) SERVER, SYSTEM AND METHOD FOR PROVIDING ACCESS TO A PUBLIC NETWORK THROUGH AN INTERNAL NETWORK OF A MULTI-SYSTEM OPERATOR

(75) Inventors: Keith M. Small, Lake Echo (CA); Stephen C. H. Swain, Halifax (CA); Andrew C. Milne, Windsor Junction (CA); James R. Currie, Dartmouth (CA)

(73) Assignee: SolutionInc Limited, Nova Scotia (CA)

( * ) Notice: Subject to any disclaimer, the term of this patent is extended or adjusted under 35 U.S.C. 154(b) by 0 days.

(21) Appl. No.: 10/589,046

(22) PCT Filed: Feb. 2, 2005

(86) PCT No.: PCT/CA2005/000123

§ 371 (c)(1),
(2), (4) Date: Aug. 10, 2006

(87) PCT Pub. No.: WO2005/079000

PCT Pub. Date: Aug. 25, 2005

(65) Prior Publication Data

US 2007/0180142 A1     Aug. 2, 2007

(30) Foreign Application Priority Data

Feb. 11, 2004   (CA) .................................. 2457368

(51) Int. Cl.
*G06F 15/173* (2006.01)
*G06F 12/00* (2006.01)
(52) U.S. Cl. .................... 709/223; 709/250; 725/111
(58) Field of Classification Search ............. 709/223, 709/226, 238, 250; 725/111
See application file for complete search history.

(56) References Cited

U.S. PATENT DOCUMENTS

| | | | |
|---|---|---|---|
| 6,178,455 B1 * | 1/2001 | Schutte et al. | 709/228 |
| 6,189,102 B1 * | 2/2001 | Beser | 726/2 |
| 6,857,009 B1 * | 2/2005 | Ferreria et al. | 709/219 |
| 2001/0054101 A1 * | 12/2001 | Wilson | 709/225 |
| 2002/0075844 A1 | 6/2002 | Hagen | |
| 2004/0024879 A1 | 2/2004 | Dingman et al. | |

FOREIGN PATENT DOCUMENTS

WO             01/30130           5/2001

* cited by examiner

*Primary Examiner*—Zarni Maung
(74) *Attorney, Agent, or Firm*—Carmody & Torrance LLP

(57) ABSTRACT

A network service management server is provided for an internal network operated by a multi-system operator, at a selected location of the internal network, such as a network head-end. The server registers a client connecting to one of the network entities. It also assigns to the client an address associated with the one of the network entities to which the client is connected. The server manages network services by handling information relating to network services for the client based on the assigned address. The server can handle network services for the client based solely on the clients assigned IP address.

23 Claims, 10 Drawing Sheets

SERVER, SYSTEM AND METHOD FOR PROVIDING ACCESS TO A PUBLIC NETWORK THROUGH AN INTERNAL NETWORK OF A MULTI-SYSTEM OPERATOR

CROSS REFERENCE TO RELATED APPLICATIONS

This application is a National Stage application of International Application No. PCT/CA2005/000123, filed Feb. 2, 2005.

FIELD OF THE INVENTION

This invention relates to public network access, more specifically, to a server, system and method for providing access to a public network through an internal network of a multi-system operator

BACKGROUND OF THE INVENTION

To date, most providers of high speed Internet provisioning systems connect a local area network (LAN) to the Internet through an on-site or local Internet provisioning server. This local provisioning server provisions, authenticates and provides a billing interface for Internet service. On the internal side of the LAN, the LAN site must offer some means of connecting the internal network traffic and routing it through a central system of the LAN. The internal side of the LAN may be made up of structured wiring/switches, digital subscriber line (DSL) technologies, wireless 802.11 devices, Ethernet over coaxial cables, and other hybrid systems to provide network connectivity to the LAN users. The Internet provisioning server connects directly to a router, which acts as a local connection to the Internet.

There exists some multi-system operators (MSOs) offering high-speed Internet services through their internal networks. For example, some cable TV service providers offer high-speed Internet services through their cable modem networks for cable TV services. A cable modem network is a network of cable modems. A cable modem allows a user computer to connect with the Internet through the cable modem network.

A nomadic user computer is often pre-configured to connect with a company network or other network which is foreign to the internal network of a multi-system operator. Thus, the user computer cannot operate on the internal network as it is.

For example, in a conventional cable modem network, a user computer that is configured to a foreign network cannot operate on the cable modem network. The user needs to modify the network configuration settings of the user computer to match those of the cable modem network. Adding a new user computer to the cable modem network usually involves system configuration changes and assistance from a technical support resource.

It is, therefore, desirable to provide a new system and method, which allows users to receive Internet services through an internal network of a multi-system operator, such as cable modem network, while maintaining their computers' pre-configured network settings for a foreign network.

SUMMARY OF THE INVENTION

It is an object of the invention to provide a novel system and method that obviates or mitigates at least one of the disadvantages of the existing systems.

The invention assigns to clients addresses that reflect the location of a client on a network. Traffic to or from an external network, such as Internet web traffic, is intercepted and forced through provisioning, authentication, registration and/or billing mechanisms prior to granting access to the external network.

In accordance with an aspect of the present invention, there is provided a network service management server for managing network services for an internal network operated by a multi-system operator, the internal network being formed with network entities. The network service management server comprises a registration driver, an address assignment handler and an information handler. The registration driver is provided at a selected location of the internal network for registering a client connecting to one of the network entities. The address assignment handler is provided at the selected location of the internal network for assigning to the client an address associated with the one of the network entities to which the client is connected. The information handler is provided for handling information relating to network services for the client based on the assigned address.

In accordance with another aspect of the invention, there is provided a network service management server for managing Internet services for a cable modem network having multiple cable modems and Cable Modem Termination Systems (CMTSs) for communicating with connected cable modems. The network service management server comprises a registration driver, an address assignment handler and an information handler. The registration driver is provided at a selected location of the cable modem network for registering a client connecting to one of the cable modems. The address assignment handler is provided at the selected location of the cable modem network for assigning to the client a client address associated with the one of the cable modems to which the client is connected. The information handler is provided for handling information relating to Internet services for the client based on the assigned client address.

In accordance with another aspect of the invention, there is provided a method of managing network services for an internal network operated by a multi-system operator, the internal network being formed with network entities. The method comprising the steps of registering, at a selected location of the internal network, a client connecting to one of the network entities, assigning to the client an address associated with the one of the network entities to which the client is connected; and handling information relating to network services for the client based on the assigned address.

In accordance with another aspect of the invention, there is provided a computer readable medium storing the instructions or statements for use in the execution in a computer of the method of managing network services for an internal network operated by a multi-system operator, the internal network being formed with network entities.

In accordance with another aspect of the invention, there is provided electronic signals for use in the execution in a computer of the method of managing network services for an internal network operated by a multi-system operator, the internal network being formed with network entities.

In accordance with another aspect of the invention, there is provided a computer program product for use in the execution in a computer a method of managing network services for an internal network operated by a multi-system operator, the internal network being formed with network entities. The computer program product comprises a module for registering, at a selected location of the internal network, a client connecting to one of the network entities, a module for assigning to the client an address associated with the one of the network entities to which the client is connected and a module for handling information relating to network services for the client based on the assigned address.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

The invention is suitably used for an internal network operated by a multi-system operator (MSO). The internal network comprises multiple network entities for connecting clients and routing client traffic. The invention allows management of external public network service offerings, such as the Internet service offerings, to the clients through the internal network.

Embodiments of the present invention are now described for a cable modem network operated by a cable TV service company. However, the present invention may be applied to different types of internal networks of MSOs, such as but not limited to Digital Subscriber Line (DSL) networks.

Figure 1A:
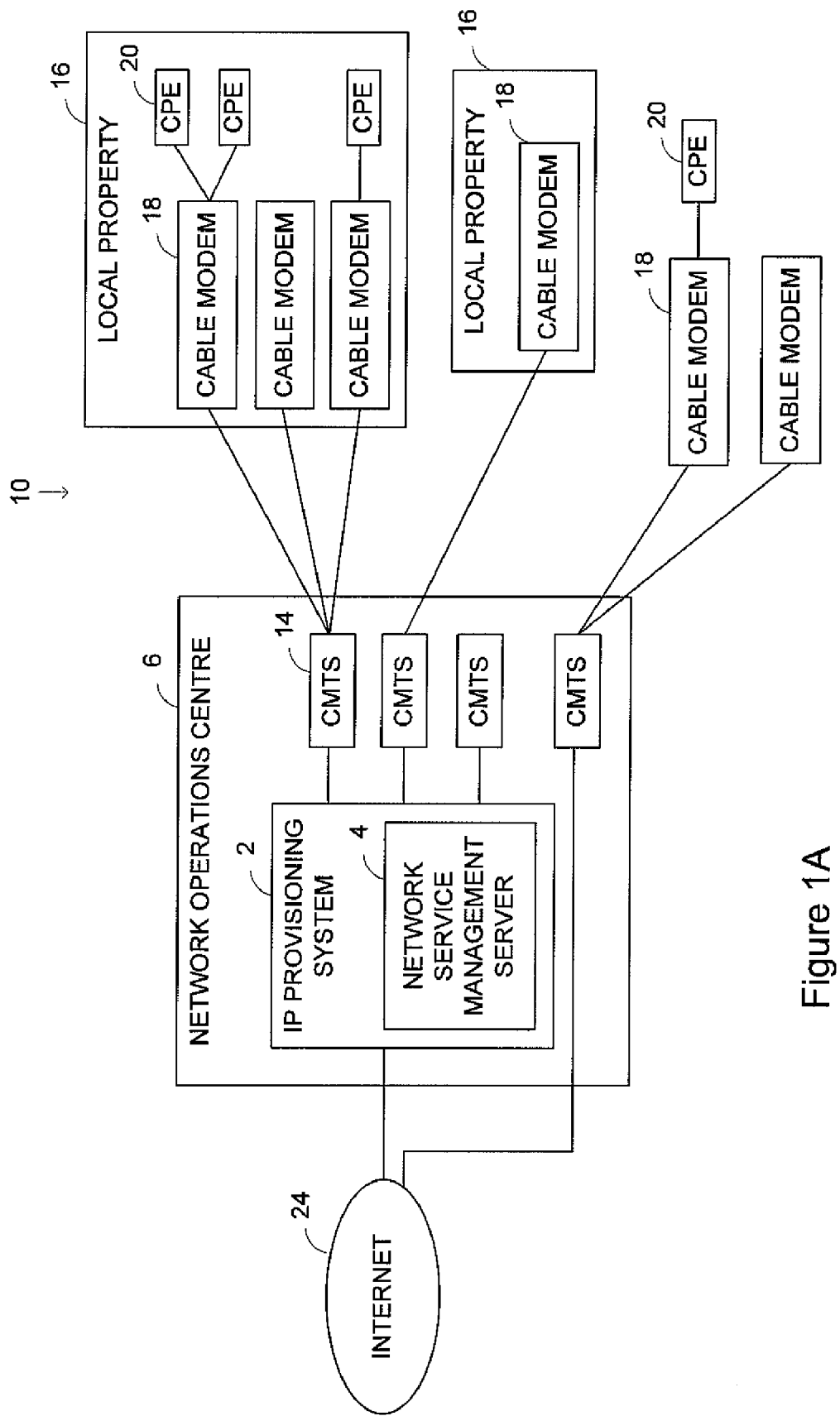
FIG. 1A is a block diagram showing an IP provisioning system in accordance with an embodiment of the invention.

FIG. 1A shows an IP provisioning system 2 for a cable modem network 10 in accordance with an embodiment of the present invention. The cable modem network 10 may be a new or existing network that comprises cable modems 18 and Cable Modem Termination Systems (CMTSs) 14.

The IP provisioning system 2 is provided at the cable head-end of the cable modem network 10 in a central site of a cable company operating the cable modem network 10, typically in or near a cable company Network Operating Center (NOC) 16 where CMTSs 14 are provided. The IP provisioning system 2 acts as a gateway to the Internet 24 for the cable modem network 10.

The cable modem network 10 provides connectivity to multiple cable modems 18. Cable modems 18 may be wired or wireless cable modems.

A group of cable modems 18 is located in a local property 16, such as hotels, convention centers, public Internet locations such as coffee shops, waiting rooms, airports and other properties which provide Internet services to users.

Each cable modem 18 has one or more ports or interfaces, each to accept connection with user's Customer Premise Equipment (CPE)120, such as a laptop computer, personal digital assistant (PDA) device or other Internet service access device.

Cable modems 18 are connected to CMTSs 14 residing in the NOC 6. One or more cable modems 18 may be connected to a single CMTS 14.

A CMTS 14 is capable of communicating with cable modems 18 connected to the CMTS 14, receiving signals sent upstream from CPEs 20 associated with the connected cable modems 18, converting the signals into Internet Protocol (IP) packets and routing the signals for connection to the Internet 24, and sending signals downstream to the associated CPEs 20 through the cable modems 18.

Also, the NOC 6 may also have one or more CMTSs 14 which communicate with one or more cable modems 18 individually for individual subscribers who do not belong to any local properties 16. Those CMTSs may bypass the IP provisioning system 2, if desired.

Cable modems 14 which are connected to CMTSs 14 are sometimes referred to collectively as "clients" or "network entities", hereinafter.

The IP provisioning system 2 has network provisioning functionalities, authentication functionalities, and billing service functionalities to perform network provisioning, authentication services and billing services.

The network provisioning functionalities include functionality that performs provisioning of cable modems. Also included is a plug and play functionality that allows users to use their CPEs 20 configured for a foreign network and connect them to the Internet 24 through the cable modem network 10 without changing the network configuration settings. Examples of network applications used for Internet services include email, Virtual Private Network (VPN) connectivity, instant messaging, and Voice over IP.

The authentication functionalities include a registration functionality that allows users to register their CPEs 20 at desired cable modems 18. The network service management server 4 does not need to provision any cable equipment in order to operate as an authenticating gateway for CPEs connected to a CMTS.

The billing functionalities include client location resolution functionality that resolves a physical location of a cable modem 18 or its port to which a specific CPE 20 is connected. The billing functionality allows the local property operator to bill each user based on a pay per use basis. These functionalities are further described below.

The IP provisioning system 2 uses a network service management server 4 and/or other servers to provide these functionalities. The network service management server 12 may act as a sole network provisioner or partial network provisioner for any or all cable modems 18 and the CPEs 20 connected to the CMTSs 14. When the network service management server 4 acts as a sole network provisioner, it performs all three functionalities. When acting as a partial network provisioner, it shares some functionalities with other network service management server or other third party server or system. A network service management server 4 may maintain public access Internet service across the entire cable modem network 10, or may maintain public access Internet service to part of the cable modem network 10 for selected cable modems 18.

Figure 1B:
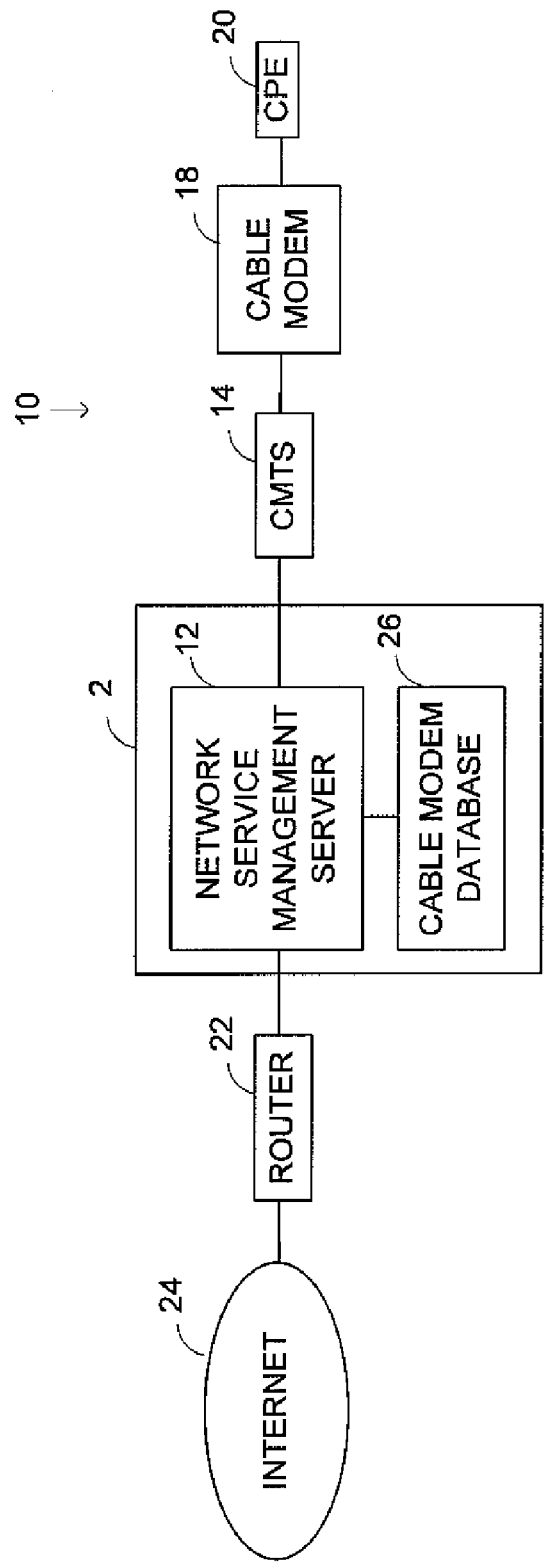
FIG. 1B is a block diagram showing a network service management server in accordance with an embodiment of the present invention.

Referring to FIG. 1B, an embodiment is described where the network service management server 4 is embodied by a network service management server 12 that acts as a sole network provisioner and performs network provisioning functionalities. This embodiment is described using a hotel as an example of a local property 16. For simplicity of the drawings, a single cable modem 18 is shown in the hotel 16, and a single CMTS 14 is shown in an NOC 6.

The CMTS 14 may operate in Routing Mode for routing traffic, or Bridging Mode for bridging traffic. The CMTS 14 may also perform filtering and traffic shaping. Preferably, the CMTS 14 is a Data Over Cable Service Interface Specification (DOCSIS) compliant system. Also, preferably, the cable modem 18 is a DOCSIS compliant device. The network service management server 12 identifies, collects and dynamically maintains information on each cable modem 18, and/or a group of cable modems and CPEs A nomadic user can connect a CPE 20 that is configured to a foreign network to the cable modem 18. The CPE 20 may be a Dynamic Host Configuration Protocol (DHCP) client CPE which does not have an IP address, or a statically configured client which has a static IP address assigned to it for the foreign network. The network service management system 12 can provide plug and play provisioning for statically configured client CPEs when the CMTS is operated in Bridging Mode, as described below.

The network service management server 12 integrates with the cable modem network 10 to perform IP provisioning, authentication services and billing services for local property operators who subscribe to these services from the cable operator. Each point of connection to the cable modem network 10, e.g., each point where a local property is connected, is configured to present custom interfaces suitable for the local property owner. Custom interfaces may include registration screens, fee schedules and Internet connection options, as further described below.

These functionalities are controlled and maintained by the network service management server 12 at the NOC 6. The cable company operator can assign different service offerings to individual cable modems or group of cable modems. Thus, for example, different hotels may provide different offerings to their customers. Also, different rooms in a hotel may have different offerings.

Each cable modem 18 is identified by a unique Media Access Control (MAC) address. The information relating to each relevant cable modem 18, such as settings, billing schedules and connection options, is stored in a cable modem database 26. The stored information of each cable modem is linked to the MAC address of the cable modem.

In FIG. 1B, the database 26 is provided separately from the network service management server 12. However, the database 26 may be provided in the network service management server 12.

The cable company operator or other installer may install cable modems 18 for a local property 16. The network service management server 12 tracks and maps each cable modem 18 to its physical location, such as a guest room in a hotel 16. This mapping information, i.e., the physical location of the cable modem 18 is linked to the MAC address of the cable modem 18, and is also stored in the cable modem database 26.

Using this mapping information, when a user connects a CPE 20 to a cable modem, the network service management server 12 can resolve the physical location, e.g., the guest room, from which the user connected the CPE 20 to the cable modem 18.

The CPE 20 is thus provisioned and further authenticated by the network service management server 12. The network service management server 12 also manages and tracks billing information associated with the services offered through the cable modem network 10 for each CPE 20. The services offered by the network 10 are billed on a pay per use basis (e.g., fixed time length, time based, bandwidth usage, per minute usage).

As each cable modem is managed individually, the local property and the cable company may customize presentation pages, such as a registration page, billing schedules and connection options, for each of the cable modems to have a localized look and feel as if the service is being provided at the local property.

The network service management server 12 offers plug and play functionality for clients connecting their network CPEs 20 through a cable modem network. It offers nomadic users nomadic Internet service through the cable modem network. The network service management server 12 enables the users to maintain the pre-configured network settings of the CPEs to obtain such services.

In order to provide this plug and play functionality, the network assigns a router-aware IP address to a CPE 20, and seamlessly redirects the CPE traffic to the external network, e.g., to the Internet 24.

The server 12 provides transparent network access via two mechanisms: Network Address Translation (NAT): and Masquerading.

NAT: Each internal system (client) is assigned a unique IP address by the network service management server 12, in order to provide network access to those internal systems. DHCP clients request such an IP address from the network server. Statically-addressed clients are not made aware of this unique IP address; instead, the network service management server 12 maintains an internal mapping of a statically-addressed client's static address to the unique IP address assigned to that client by the network service management server 12.

The network service management server 12 can assign either private or public IP addresses to clients. Clients may choose to be assigned either a private or public address at registration time, or the network service management server 12 can be configured to assign only public or addresses. When the internal network contains routers, the network service management server 12 can be configured to assign either all public or all private addresses to routed clients on a per-router basis.

The network service management server's NAT module performs address translation on traffic to and from statically-addressed clients, by referring to the network service management server's internal mapping described above.

The network service management server 12 will masquerade traffic from clients which have been assigned private IP addresses, so that those clients' outbound traffic originates from the network service management server's external IP address.

Masquerading: Each internal system appears to the outside world with the IP address of the server. This requires special protocol-aware handlers (proxies) for protocols like active-mode File Transfer Protocol (FTP), which try to create independent return connections back to the client, and also modifications are made to support Transmission Control Protocol (TCP) "connections" (stateful packet inspection).

Thus, the user can access the Internet 24 without changing the network configurations of CPE 20. The assignment of router-aware IP address is further described below in connection with the registration of CPEs.

To allow connection of CPEs 20, the network service management server 12 also performs registration and authentication services. Prior to registration for the network service, any attempts to access the services across the Internet 24 are detected and intercepted by the network service management server 12. The network service management server 12 invites the CPE 20 to register for the network service. The network service management server 12 resolves the location of registered CPE 20 using the information stored in the cable modem database, as further described below. Using the location of the CPE 20 and registration information, the network service management server 12 performs billing services.

Figure 1C:
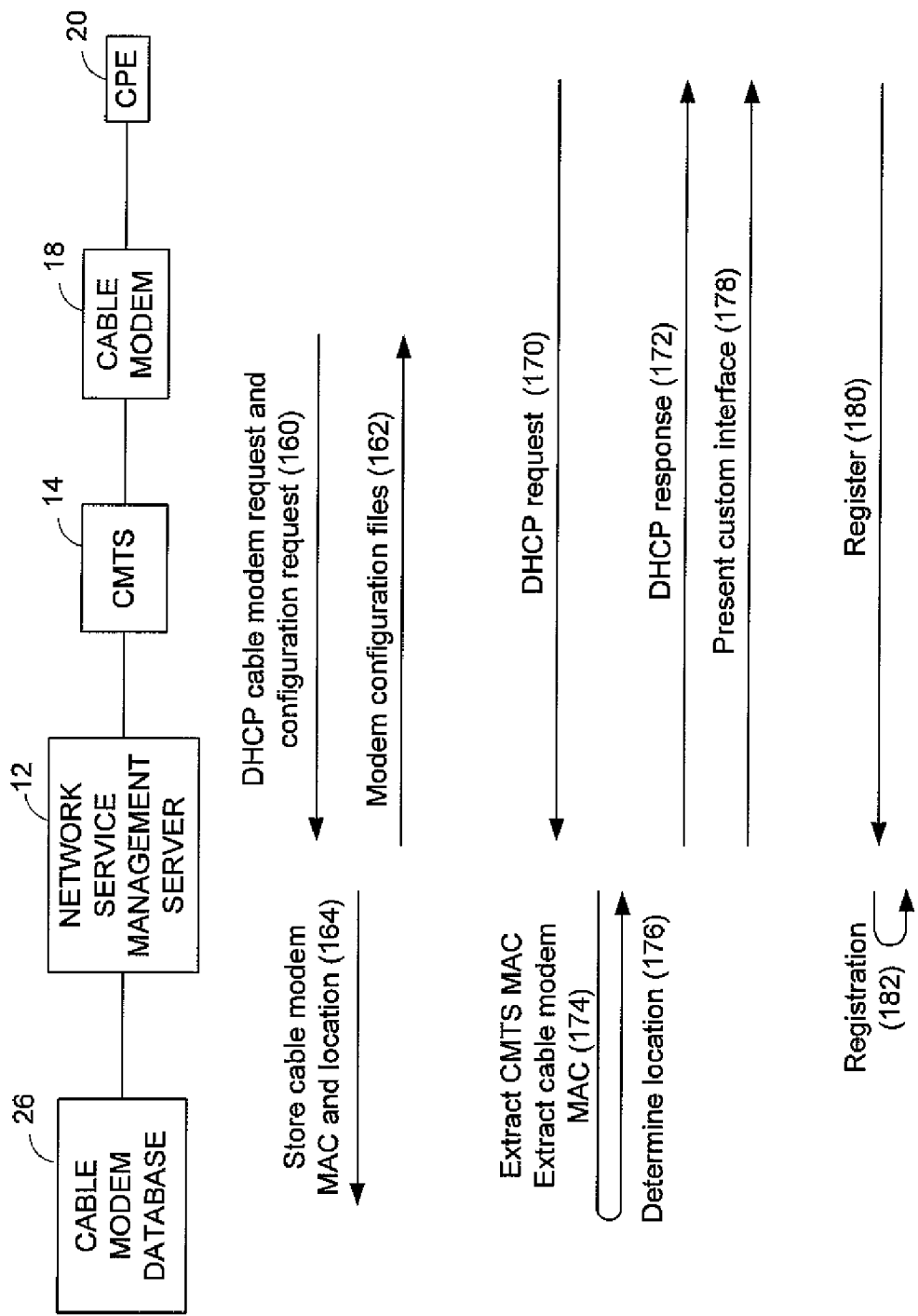
FIG. 1C is a flow block showing an operation of the network service management server.

FIG. 1C shows an example of operation of the network service management server 12. In this embodiment, the network service management server 12 handles network traffic for DHCP, time of day (TOD), Domain Name System (DNS) and TFTP. The network traffic is passed through the cable modem 18 and the CMTS 14.

When new cable modems 18 are installed or other certain events occur, the network service management server 12 receives a DHCP cable modem request and configuration request from each cable modem 18 (160). The network service management server 12 acts on these requests and provides modem configuration files based on the requests to the cable modems (162) by using, e.g., a Trivial File Transfer Protocol (TFTP). The TFTP server configuration file includes information for the operating frequency, bandwidth limits, number of connections and Management Information Base (MIB) settings for the cable modem. The network service management server 12 stores the cable modem MAC address and the physical location in the cable modem database (164). Once all relevant cable modems are provisioned, the network service management server 12 is ready to handle network traffic from and to CPEs.

A user connects a CPE 20 which is a DHCP client CPE to a cable modem 18 and attempts to access Internet services by issuing a DHCP request (170). The network service management server 12 sends a DHCP response to the CPE 20 (172).

The network service management server 12 extracts the MAC address of the cable modem from the DHCP request (174), and can use this information to determine the physical location from which the CPE 20 is connected (176) referring to the mapping information stored in the modem database 26. Also, using this information, the network service management server 12 presents a custom interface, such as a billing fee schedule and connection options, to the CPE 20 (178). Through the custom interface, the user requests registration of the CPE 20 for Internet services (180) by sending information of selected options. The network service management server 12 registers and authenticates the CPE 20 (182).

Once the CPE 20 is provisioned and authenticated for service, upstream Internet traffic from the CPE 20 to the Internet 24 is routed through the cable modem 18, CMTS 14, network service management server 12 and router 22. Downstream Internet traffic to the CPE 20 is routed from the Internet 24 through router 22, network service management server 12, CMTS 14 and cable modem 18.

These steps are performed for each and every capable modem that is associated with the network service management server 12. This is available across the cable modem network.

Figure 3:
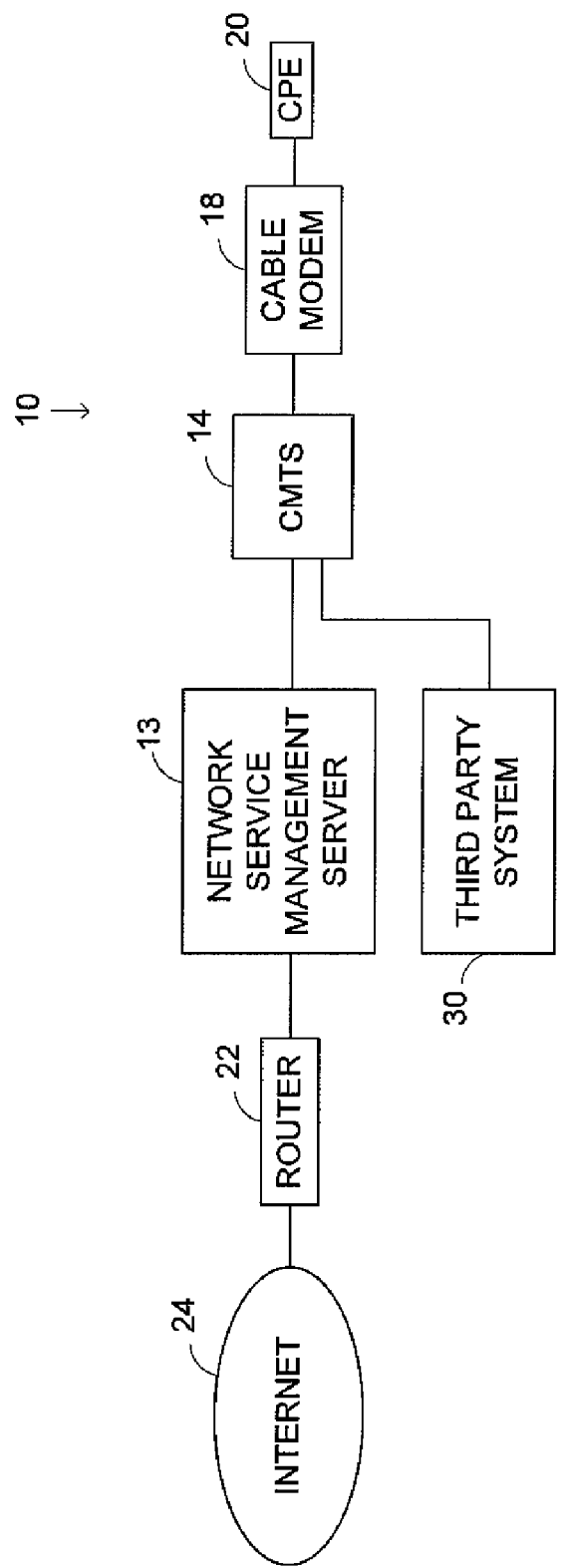
FIG. 3 is a block diagram showing a network service management server in accordance with another embodiment of the invention.

Referring to FIG. 3, another embodiment is described where the network service management server 4 is embodied by a network service management server 13 that acts as a partial network provisioner and shares the provisioning functions with a third party provisioning system 30. The network service management system 13 works with the third party system 30. The network service management system 13 can retrieve cable modem information from the third party system 30. Some MSO operators require the network architecture include a third party commercial cable modem provisioning system 30. While provisioning of some or all cable modems may be performed in the third party system 30, authentication, NAT, Proxy, billing, and Domain Name System (DNS) services take place on the network service management system 13 for the CPEs the network service management system 13 sees. The network service management system 13 and the third party cable provisioning system 30 can serve DHCP and TFTP requests to the groups of cable modems associated to their respective provisioning system.

The CMTS 14 is configured to route requests from CPE 20 to the network service management server 12 or the third party provisioning system 30 based on the MAC address of the cable modem 18. Thus, network traffic for DHCP, TOD, DNS, and TFTP is passed through the cable modem 18 and is sent to the third party provisioning system 30 or the network service management server 12.

Figure 4:
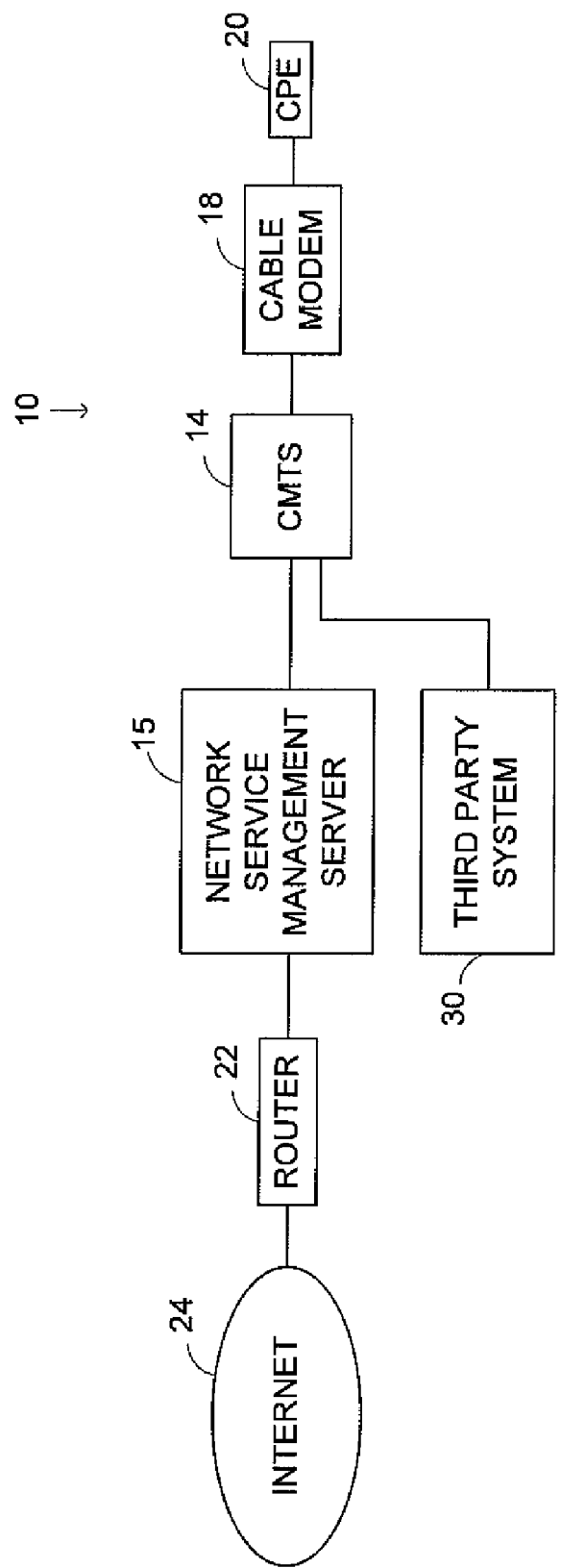
FIG. 4 is a block diagram showing a network service management server in accordance with another embodiment of the invention.

Referring to FIG. 4, another embodiment is described where the network service management server 4 is embodied by a network service management server 15 that does not perform any network provisioning functions. Network traffic for DHCP, TOD, DNS and TFTP is passed through the cable modem 18 and is provisioned by a third party provisioning system 30.

The third party provisioning system 30 handles the provisioning of the cable modems 18 and DHCP requests and configuration of the CPE 20.

The network service management server 15 can retrieve the MAC address information and determines the physical location of the CPE from the CMTS 14 or from the third party provisioning system 30. The network service management system 12 can also perform authentication and billing functions without access to the CPE MAC address.

In all embodiments shown in FIGS. 1B, 3 and 4, once the CPE 20 is provisioned and authenticated for service, upstream Internet traffic from the CPE 20 to the Internet 24 is routed through the cable modem 18, CMTS 14, network service management server 12, 13 or 15 and router 22. Downstream Internet traffic to the CPE 20 is routed from the Internet 24 through router 22, network service management server 12, 13 or 15, CMTS 14 and cable modem 18.

The network service management server 4 is further described in detail using the network service management server 12 shown in FIG. 1B, which has all three major functionalities of network provisioning, authentication and billing services. The network service management server 4 may have more or less functionalities or components than those described below.

Figure 2:
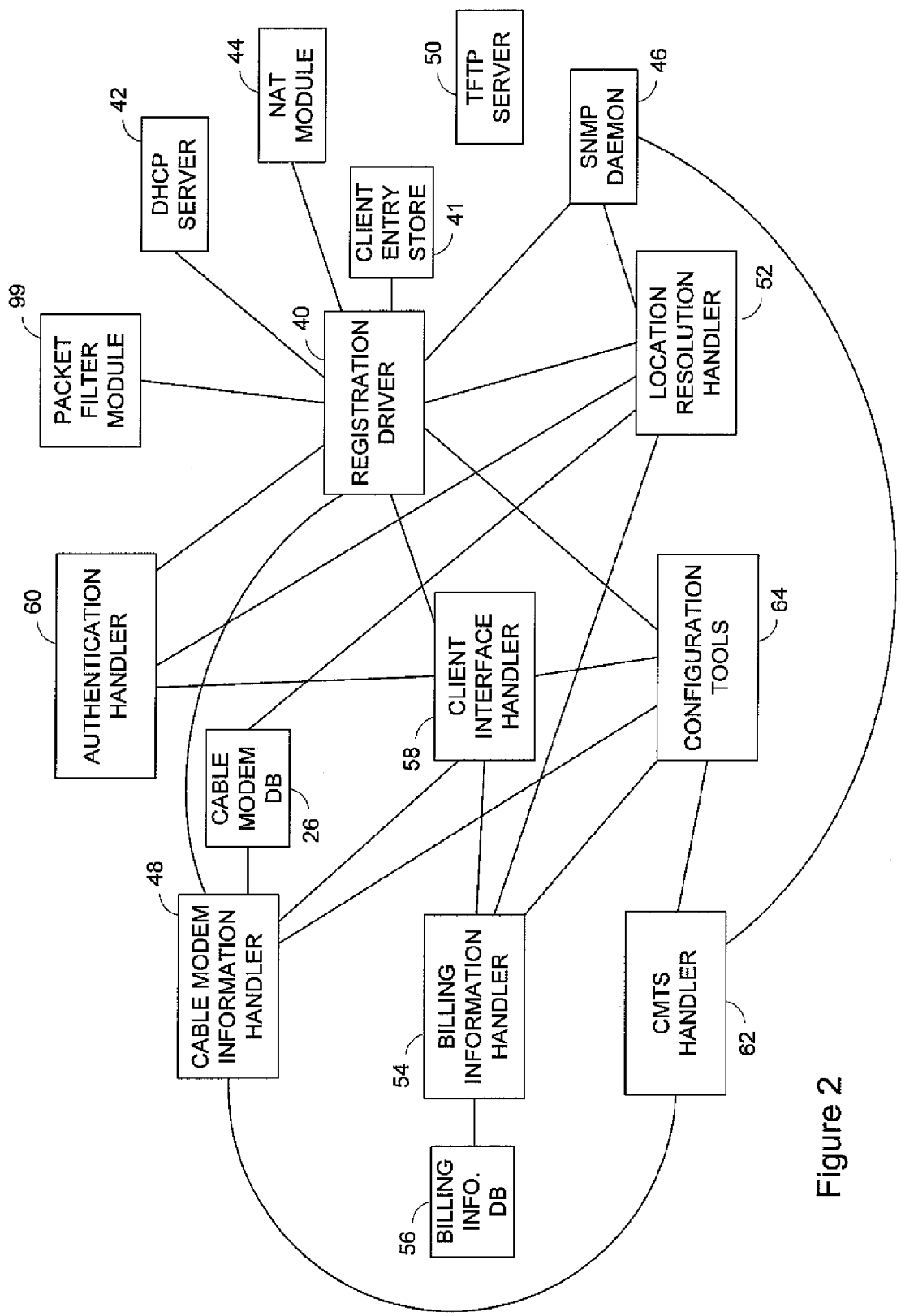
FIG. 2 is a block diagram showing an example of the network service management server of FIG. 1B.

FIG. 2 shows an example of components or functionalities of the network service management server 12.

The network service management server 12 has a registration driver 40, a client entry store 41, a DHCP server 42, a Network Address Translation (NAT) module 44, Simple Network Management Protocol (SNMP) daemon 46, a cable modem information handler 48, the cable modem database 26, a Trivial File Transfer Protocol (TFTP) server 50, a packet filter module 99, a location resolution component 52, a billing data handler 54, a billing database 56, client interface handler 58, an authentication handler 60, a CMTS handler 62 and graphical tools 64.

The registration driver 40 handles registration of CPEs and manages address information and other information of registered and unregistered CPEs stored in a client entry store 41.

The packet filter module 99 provides basic security blocking. It also intercepts web and email traffic for unregistered clients and initiates a redirection to the client interface handler.

The DHCP server 42 assigns dynamic IP addresses to devices on the cable modem network, e.g., CPEs and Cable Modems.

The NAT module 44 enables the cable modem network 10 to use one set of IP addresses for internal traffic and a second set of addresses for external traffic.

The SNMP daemon 46 manages the cable modem network 10 by sending messages, called protocol data units (PDUs), to different parts of the network. SNMP-compliant devices, called agents, store data about themselves in Management Information Bases (MIBs) and return this data to the SNMP requesters.

The cable modem information handler 48 maps each cable modem 18 to a physical location and stores the mapping information in the cable modem database 26. The cable modem mappings are further described below in detail. Also, it handles setting information relating to each cable modem 18, such as billing schedule and connection options, as described above.

The TFTP server 50 provides TFTP provisioning service and sends configuration files to cable modems. In conjunction with the DHCP server 42, the TFTP server 50 can be used to send different configuration files to different modems or groups of modems.

The location resolution handler 52 resolves physical locations of CPEs 20.

The billing data handler 54 handles billing data of each CPE and stores the billing data in the billing database 56.

The client interface handler 58 handles a client interface, such as presentation pages including registration pages and billing pages, for each local property based on the information and data handled by the cable modem information handler 48 and billing data handler 54.

The authentication handler 60 handles authentication of CPEs 20 based on the information and data handled by the registration driver 40 and cable modem information handler 48.

The CMTS handler 62 handles communication with CMTSs 14 and information of CMTSs.

Graphical tools 64 including tools for allowing users to configure settings or modify information or data handled by other components, such as the cable modem information handler 48, billing data handler 54, CMTS handler 62 and registration driver 40. An example of tools 64 is a configuration tool that allows users to configure CMTS definition, the modem mapping, and address range assignment to routing CMTSs.

The network service management server 12 operates with multiple bridging and routing CMTSs connected to the network service management server 12 simultaneously. To this end, the network service management server 12 assigns specific CPE IP address ranges, cable modem IP address ranges and switch (maintenance) IP address ranges to each routing CMTS using the registration driver 40. A switch IP address is an IP address for a managed network device. The use of these IP addresses allows the network service management server 12 to assign router-aware addresses to CPEs, modems, and network devices and thus allows operation of multiple routing CMTSs simultaneously.

Figure 5:
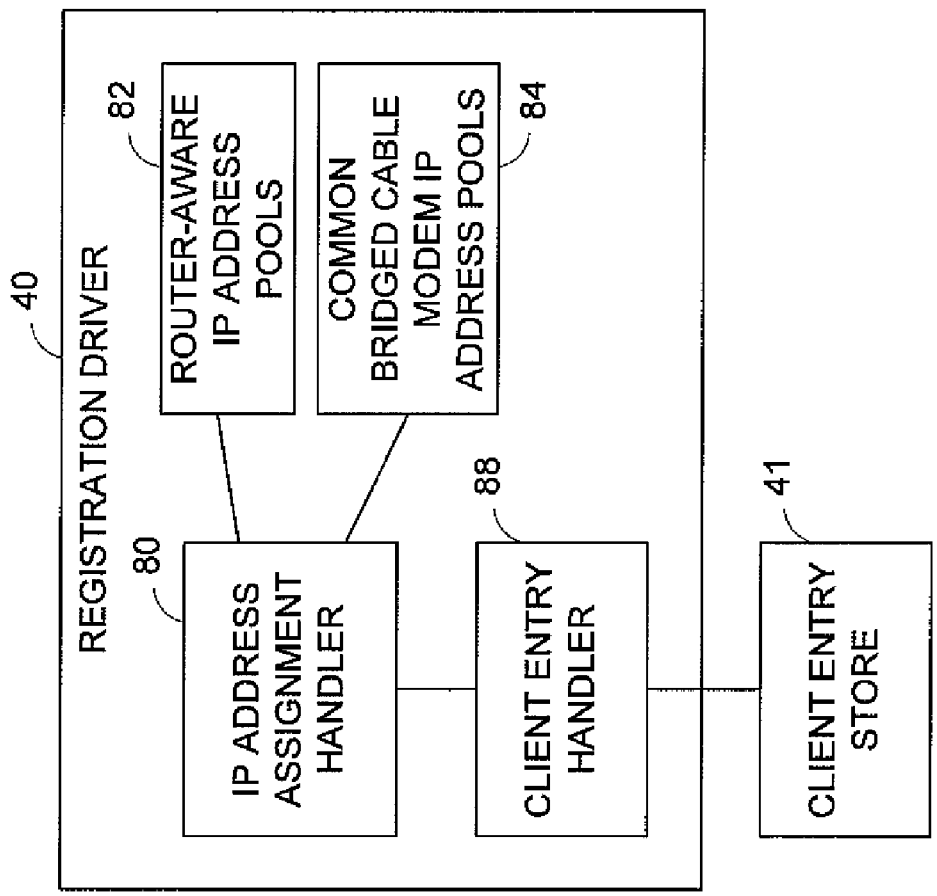
FIG. 5 is a block diagram showing one example of the registration driver of FIG. 2.

The registration driver 40 of FIG. 2 is now described in detail. FIG. 5 shows an example of the registration driver 40. The registration driver 40 contains address assignment handler 80, router-aware address pools 82, a common bridged cable modem address pool 84, client entry handler 88, and a client entry store 41.

The address assignment handler 80 assigns IP addresses to CPEs, cable modems and other network devices. Those IP addresses are selected from the CPE, cable modem and switch IP address ranges that are associated with specific routing CMTSs.

The network service management system 12 supports multiple routing devices (routers), e.g., routing CMTSs. The address assignment handler 80 assigns router-aware IP addresses to network devices. A router-aware IP address is an address which can be assigned to a network entity behind a particular router.

Bridging CMTSs share a common pool 84 of cable modem IP addresses. The address assignment handler 80 assigns to bridged CPEs IP addresses from standard bridged client IP address ranges, i.e., normal unrouted IP address ranges The IP address assignment is described in detail first for the CMTS operating in Bridging Mode.

A CPE IP address may be assigned as follows for a CPE having a fixed or static IP address that is configured for a foreign network. When the user connects a CPE to a cable modem and boots the CPE, an Address Resolution Protocol (ARP) request is generated to see if this fixed IP address is already in use. The ARP request contains the fixed IP address and a MAC address of the CPE. The network service management server picks up the ARP request and passes it to the packet driver 303 (shown in FIG. 6). The packet driver 303 asks the registration driver 40 to look up this fixed IP address for the CPE MAC address. In this case, the registration driver 40 does not find a client entry having the CPE MAC address, and accordingly, the registration driver 40 transparently assigns to the CPE a new IP address from the pool of IP addresses available for the CPE. The packet driver 303 performs NAT on the ARP packet. The CPE becomes an owner of the assigned IP address on the cable modem network. The registration driver 40 registers the CPE using the assigned IP address with the option of using the CPE MAC address.

When the network service management server 12 receives a packet from the CPE, the packet contains the fixed IP address of the CPE and the CPE MAC address. The network service management server passes the packet to the packet driver 303. The packet driver 303 examines the packet and obtains the CPE MAC address. It looks up the client entry in the registration driver 40 using the CPE MAC address, and determines the assigned IP address associated with the MAC address. If the assigned IP address is different from the fixed IP address, the packet is NATed to include the assigned IP address, and then forwarded to the next stage for transmission to the destination.

Figure 6:
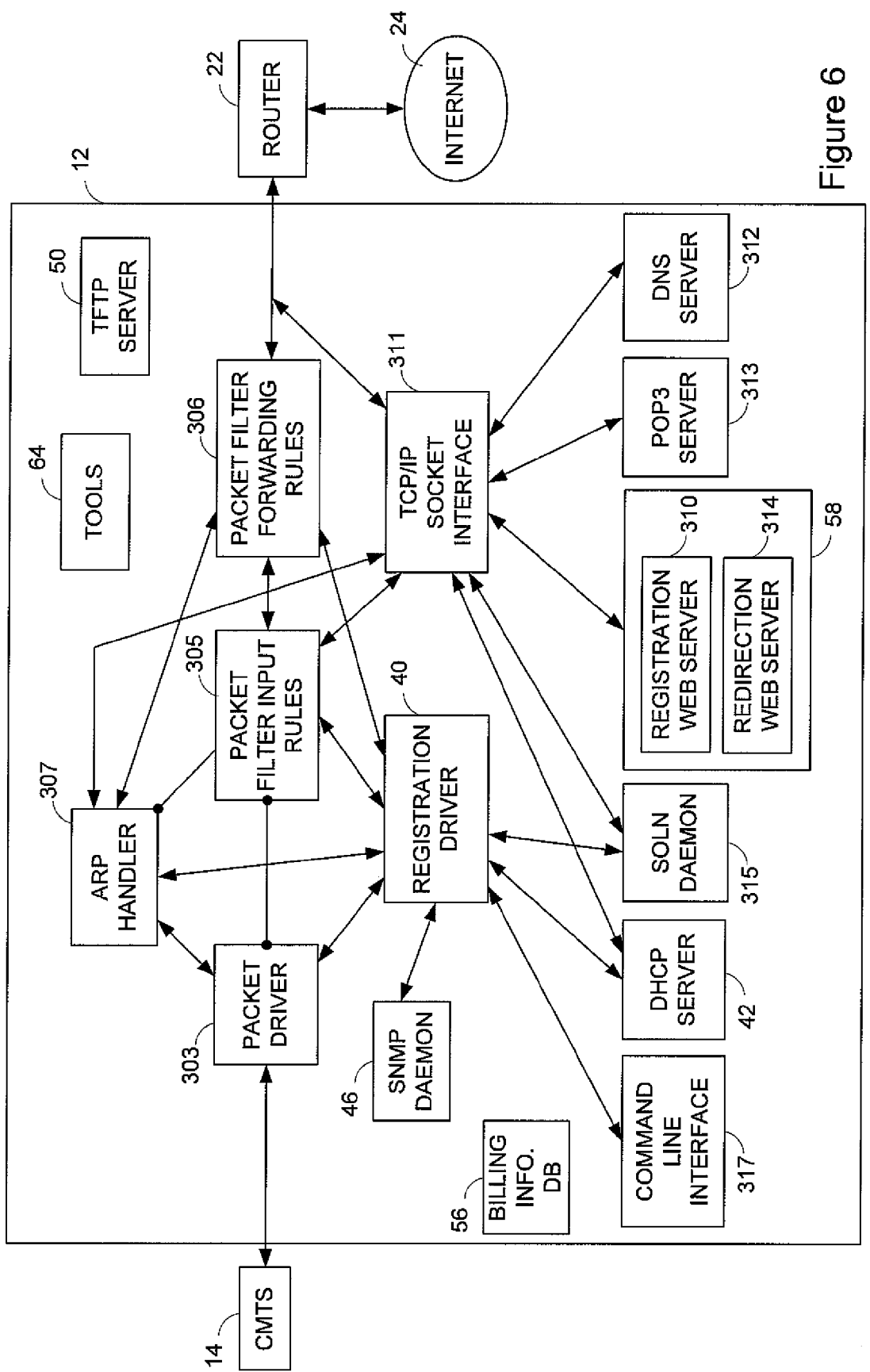
FIG. 6 is a block diagram showing other components or functionalities of the network service management server.

When the network service management server receives a packet from the Internet, the packet is passed from the packet filters to the ARP handler 307 (shown in FIG. 6). In this case, assume that the packet contains a CPE MAC address of the destined client. The ARP handler 307 looks up the CPE MAC address. The packet is passed on to the packet driver 303 that looks up the client entry for the CPE MAC address and determines the assigned IP address associated with the CPE MAC address. It thus identifies the CPE to which the packet is destined. If the assigned IP address is different from the fixed IP address of the CPE, the packet driver 303 performs NAT on the packet so that the packet contains the fixed IP address. The packet is then transmitted to the CPE.

Thus, the CPE can use its fixed IP address to send and receive messages. The user does not need to change the IP address of the CPE to connect to the cable modem network.

The user can access Internet services through the cable modem network without changing the network configurations, e.g. the IP address.

The IP address assignment is now described in detail for the CMTS operating in Routing Mode.

The assignment of addresses in other scenarios and determination of the CPE MAC are further described below.

Some existing routing CMTSs use publicly addressable IP addresses, such as RealIP (trade-mark). The network service management server 12 supports those publicly addressable IP addresses, including RealIP to use with those routing CMTSs.

The address assignment handler 80 allows configuration of multiple, distinct router aware pools 82 of IP addresses by a system operator. Each router-aware IP address pool 82 comprises masqueraded and/or routable address ranges, and is assigned to a specific routing CMTS.

Graphical tools 64 shown in FIG. 2 includes a configuration tool which is used to define the router-aware CPE, cable modem, switch address pools 82 and the bridged cable modem address pool 84. Also, graphical tools 64 include a tool which is used to define IP address ranges for each CMTS. Similar tools may also be provided in the registration driver 40.

When clients are registered, the client entry handler 88 updates the information of the clients in the client entry store 41.

Each client entry 68 is router-aware, i.e., contains a router MAC address. An IP packet has a source MAC address of the most recent router, regardless of how many routers that packet has traversed. The network service management server 12 considers the source MAC address of an IP packet to be the router MAC address of the client sending that packet. Thus, a router MAC address for a client is automatically and dynamically set to the source MAC in the most recent IP packet sent from the IP address of the client. Consequently, the network service management server 12 always knows if a client message is being routed (router MAC!=client MAC), and which router that the client is behind, or if the client is bridged (router MAC=client MAC).

Each IP packet also has a source IP address. The network service management server 12 considers the source IP address of the IP packet to be the client IP address. The network service management server 12 can determine the client MAC address by either examining DHCP packets sent from the client to the network service management server 12, or by querying a Management Information Base (MIB) on the router as described below.

Cable modems are considered by CMTSs as DHCP relay agents that relays DHCP messages to DHCP server 42 (FIG. 2). Each client entry is also DHCP relay agent-aware, and contains a relay agent information (RAI) MAC address.

When the client sends a DHCP option 82, the RAI MAC address is updated with the RAI MAC in the DHCP option 82 received from the client. A setting on most CMTSs enables the attachment of DHCP option 82 into DHCP DISCOVER packets which are forwarded by the CMTS to the other network devices, i.e., the network service management system 12 in this case.

The RAI MAC is used in client location resolution as described below. The RAI MAC is also used as a means of determining if a network entity is a CPE (client MAC!=RAI MAC) or cable modem (client MAC=RAI MAC).

Accordingly, each client entry in the registration driver contains three MAC addresses: client MAC; router MAC; and RAI MAC. The combination of these three MACs provides the network service management system 12 with useful information about the client.

Each client entry includes the original IP address (in the case of a statically addressed clients), assigned IP address, as well as the client MAC address, router MAC address and RAI MAC address. In some network configurations, the network service management server 12 may have access to only a subset of the data which the network service management server 12 is capable of collecting.

For example, in a routed cable network which uses a third party DHCP server, the network service management server 12 typically has access to only the router MAC address and the assigned IP address of the client. In such a network, the network service management server 12 maintains entries for several clients possessing the same router MAC address but client assigned IP addresses that are uniquely assigned to individual clients.

The network service management system 12 is capable of identifying and processing clients by assigned IP addresses that are uniquely assigned to individual clients by the IP address assignment handler 80. This allows the server 10 to handle routed clients even if the network service management server 12 is used for a routed cable network with a third party DHCP or does not receive DHCP traffic, and the network service management server 12 sees no client MAC addresses. Situations where the network service management system 12 receives no DHCP traffic and therefore no client MAC addresses occur in routed cable networks which use a third party provisioning server as the sole provisioning agent or system 30 (FIG. 4).

The network service management server 12 sees the Internet-bound traffic in the form of (routermac, clientip), where "routermac" represents a router MAC address, and "clientip" represents the IP address of a client. The NAT module 44 (FIG. 2) creates multiple client entries in the registration driver based upon this traffic, with the client MAC=router MAC, i.e., as (clientmac, clientip). The client IP address is used to differentiate those multiple client entries.

Thus, the network service management server 12 can operate solely upon client IP addresses. This allows the network service management server 12 to act more as a gateway with billing and location-related features, than as a provisioning gateway.

The network service management server 12 may not receive traffic containing client MAC. In this case, if the routing CMTS offers an appropriate Management Information Base (MIB), then, the network service management server 12 can retrieve the client MAC in realtime from the routing CMTS when network service management server 12 tries to resolve a client's location. This occurs when a client is redirected to a menu for registration. This MIB must contain (MAC,IP) pairs, i.e., client MAC and IP address pairs, for the network entities which the CMTS routes. Here a client MAC is a CPE MAC or cable modem MAC. An example of this MIB is ipNetToMediaPhysAddress table. When such an MIB is available and contains an entry for the IP address in question, the network service management server 12 automatically and in realtime retrieves the corresponding MAC and updates the client entry to be (clientmac, clientip) from (routermac, clientip). This provides the network service management server 12 with more specific data for that client.

While the network service management server 12 is capable of using assigned IP addresses as the unique identifier for its clients, the network service management server 12 may collect other information for clients when that information is available to the network service management server 12. For example, when the network service management server 12 acts as the DHCP server for a routed cable network, the network service management server 12 has access to the client MAC addresses, and possibly the RAI MAC addresses, which are included in the DHCP packets. In that case, the network service management server 12 records these client MAC addresses, but still uses the client assigned IP addresses as unique identifiers for its clients. The other information which is collected, such as the MAC addresses, enables certain functionalities of the network service management server 12. For example, when the network service management server 12 has access to RAI MAC addresses, the network service management server 12 can perform the CPE location resolution using those RAI MAC addresses, as described below.

The ability of using only the client assigned IP addresses as the unique client identifier allows the network service management server 12 to be integrated into a wide variety of network configurations.

The SNMP daemon 46 shown in FIG. 2 is described in detail. The SNMP daemon 46 allows the retrieval of client MAC from a MIB, such as ipNetToMediaPhysAddress table, and updates the client entry in the registration driver accordingly as described above. The SNMP daemon can also read other standard and non-standard MIBs (as required) in order to perform location resolution.

The SNMP daemon 46 may also resolve the CPE's location based upon assigned IP address, instead of only the client MAC address. This offers location-based functionality in routed environments in which the network service management server 12 does not have access to CPE MAC addresses (i.e. no DHCP traffic).

The SNMP daemon 46 supports relevant DOCSIS MIBs on CMTSs for use in modem mapping and client MAC resolution, and supports some proprietary non-DOCSIS MIBs which offer CPE-modem association on, for example, Cisco UBR7000 series CMTS (trade-mark), Motorola CMTS (trade-mark), BSR64000 CMTS (trade-mark), Arris 1000/Arris 1500 CMTS (trade-mark). This allows the server 12 to perform location resolution using only SNMP functionality on these CMTSs as opposed to using RAI-based location resolution.

Cable modem mapping by cable modem information handler 48 shown in FIG. 2 is now described in detail. The cable modem information handler 48 can map cable modems on a CMTS, i.e., retrieve and insert information regarding cable modems into the registration driver 40 and cable modem database 26 for use in CPE location resolution. It can map cable modems by referencing specific standard MIBs, such as standard DOCSIS MIBs on the CMTS. Thus, the cable modem information handler 48 can map cable modems on virtually any CMTS to which the network service management server 12 has at least read-only SNMP access.

The cable modem information handler 48 does not need to receive any unsolicited traffic, such as DHCP, TFTP, TOD, from cable modems 18 in order to map them. The network service management server 12 retrieves enough information about cable modems 18 from the MIBs on the CMTS 14.

The network service management server 12 stores modem mappings for multiple CMTSs. This allows the network service management server 12 to offer full functionality to multiple CMTSs simultaneously.

Graphical tools 64 include a tool for controlling, viewing, and editing the results of modem mapping.

The cable modem information handler 48 allows discretionary modem mapping. It provides a means to specify inclusion or exclusion lists listing cable modem MAC to be included or excluded. Thus, the cable modem information handler 48 can control which cable modems should be mapped and which cable modems should not be mapped. This functionality is convenient when a CMTS is hosting cable modems which the network service management server 12 does not need to manage, or when the network service management server 12 performs different types of mapping on different groups of modems.

There are two types of mappings: portless modem mapping and detailed modem mapping. Some cable modems have multiple ports or interfaces. Examples include ethernet, usb, and wireless interfaces. The portless mapping treats each cable modem as a single logical port without consideration of the number or types of the modem's interfaces. The detailed modem mapping maps each individual port or interface on a cable modem as distinct logical ports.

The portless modem mapping is much faster than detailed modem mapping, since the modem's standard interface MIBs do not need to be queried by the network service management server 12.

The detailed mapping may take a long time. However, it allows the network service management server 12 to treat the cable modems 18 as managed network devices. Other managed network devices may be placed behind the cable modems, and the network service management server 12 can offer full functionality to all devices.

When the cable modem 18 is mapped in accordance with the portless mapping, the port resolution by the network service management server 12 determines from which modem a CPE's traffic is originating.

When the cable modem 18 is mapped in accordance with the detailed mapping, the port resolution by the network service management server 12 determines from which modem interface a CPE's traffic is originating.

The network service management server 12 communicates with the cable modem 18 to perform the detailed mapping. The network service management server 12 does not need to communicate with the cable modem 18 to perform the portless mapping.

Figure 7:
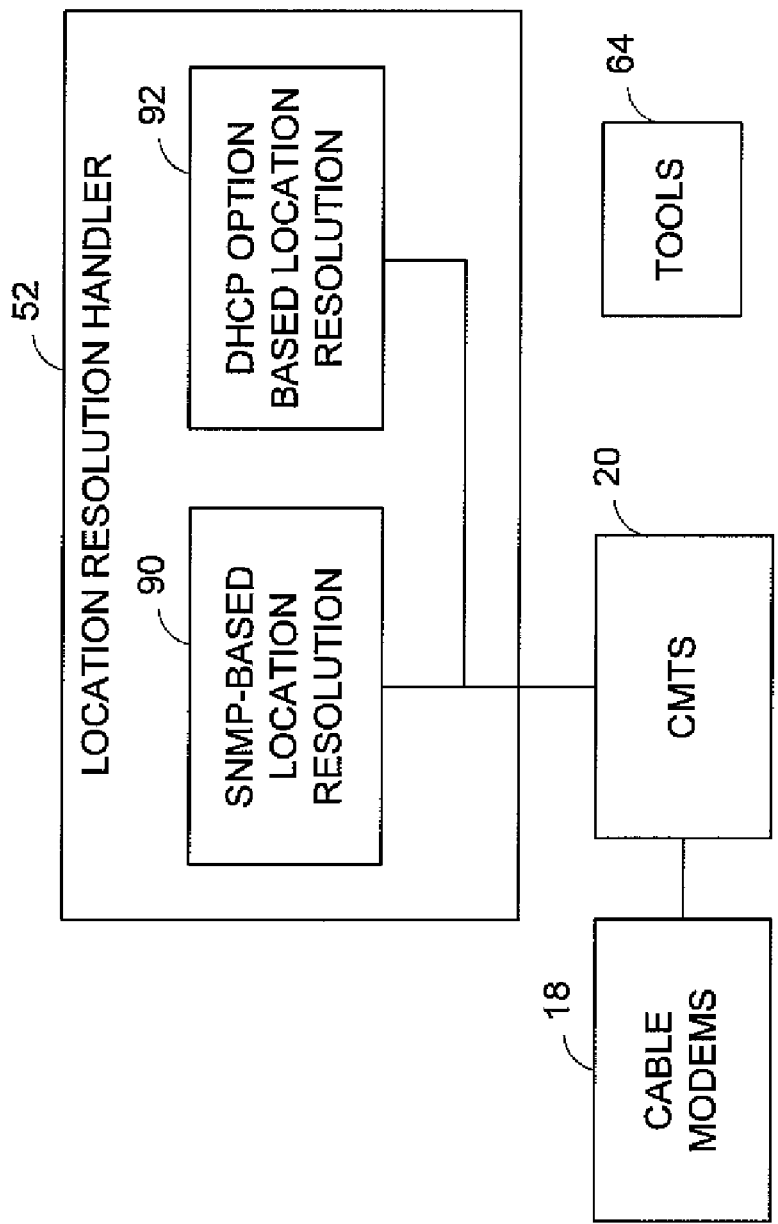
FIG. 7 is a block diagram showing one example of the location resolution handler of FIG. 2.

Once a cable modem to which a CPE is connected is mapped, location resolution of the CPE can be performed. FIG. 7 shows one example of the location resolution handler 52 of FIG. 1B. The location resolution handler 52 has two CPE location resolution mechanisms: SNMP-based location resolution 90 and DHCP option based location resolution 92. The location resolution handler 52 performs the CPE location resolution using either the mechanism 90 or 92.

The location resolution handler 52 can perform SNMP-based location resolution 90 when the network service management system 12 knows the CPE MAC address, i.e., when it either receives CPE DHCP traffic or has access to the ipNetToMediaPhysAddress MIB on the CMTS 14. In the absence of CPE DHCP traffic, the location resolution handler 52 queries a proprietary MIB (i.e. non-DOCSIS MIB) on the CMTS 14. This MIB provides CPE MAC—cable modem MAC association. Thus, based on the known CPE MAC address, the location resolution handler 52 can obtain the cable modem MAC address from the association and resolve the physical location of the cable modem using the information in the cable modem database 26. For this resolution 90, the CMTS should provide an adequate proprietary CPE MAC-cable modem MAC association MIB in response to the query.

The location resolution handler 52 can perform DHCP Option based location resolution 92 when the network service management system 12 receives CPE DHCP traffic. The location resolution handler 52 automatically records the CPE's RAI MAC address based on the DHCP Option 82. The RAI MAC address is included in at least the CPE's DHCP DISCOVER packets, and in the CPE's client entry in the registration driver.

This RAI MAC address will be the MAC address of the cable modem 18 to which the CPE 20 is connected. For modem DHCP DISCOVERS, the RAI MAC address is the same as the cable modem MAC. Therefore, if the network service management server 12 does not have access to a proprietary CPE-CM association MIB on the CMTS 14, and if the network service management server 12 receives CPE DHCP traffic, the network service management server 12 can use the RAI MAC address which it has recorded for the CPE in order to determine to which cable modem the CPE 20 is connected.

When the cable modem 18 has been mapped in detail, the network service management server 12 can then proceed to query the modem's standard bridge MIBs to determine to which modem port the CPE is connected.

According to the above embodiments of the present invention, a cable operator can choose to offer nomadic Internet services as a wide area provider across their entire network. The existing cable network continues to provide conventional cable modem residential and commercial Internet service. In addition, a cable company can extend its offering to include service to nomadic Internet users.

The Internet service can be billed on a pay per use basis. The clients authenticate and may pay for service using credit cards, pre-pay cards, or a subscription account. Any location where a cable company presently offers network service via a cable modem is configured to operate as a pay per use public Internet access node.

Referring to FIG. 6, additional components or functionalities included in the network service management server 12 are described.

The network service management server 12 includes a packet driver 303. The packet driver 303 examines incoming packets. If the incoming packet is identified as a routed packet, the packet driver will assign an IP address equal to the original IP address. If the packet is a bridged packet, its MAC address is looked up in the registration driver 40. If this is the first time that this MAC address is encountered, then an IP address is assigned, and if the source IP address of the packet is a valid unassigned IP address, then that IP address will be assigned to that MAC address. Once the assigned IP address is determined, sanity tests are applied to ensure that the original IP address associated with the MAC has not changed in an unacceptable manner, if it has changed in an unacceptable manner then the entry is deleted, thus forcing the client to re-register if they were previously registered. If the assigned IP address is different from the original IP address in the client's packet then that IP address will be replaced with the assigned IP address in the IP or ARP header and the packet checksum recalculated according to the methods described in RFC-1624. If the packet contains a TCP or UDP packet then the checksum is further recalculated as above to account for the changed IP address in the pseudo-header associated with such packets as described in section 3.3 of RFC-1631.

All outgoing packets have their source destination address looked up in the registration driver 40 (as an assigned IP address). If a matching entry is found then the original IP address is substituted provided it is non-zero and not equal to the current destination address. Then the packet's checksums are recalculated as described above for incoming packets.

The network service management server 12 includes a packet filter input rules handler 305 and a packet filter forwarding rules handler 306 (referred to as packet filter rules handlers). The packet filter rules handlers 305, 306 allow packet filter rules that test the state of the registration entry flags for the source and/or destination addresses of packets.

The network service management server 12 includes TCP/IP socket interface 311, a soln daemon 315 and a command line interface 317. The TCP/IP socket interface 311 is the standard socket networking interface, such as an interface provided by Linux, Unix.

The soln daemon 315 is responsible for performing regular periodic backups of the registration driver. It also listens for UDP traffic on a specified port. The command line interface 317 offers an administrative and diagnostic tool to system administrators. It serves as a user space interface into the registration driver 40. It may be used to check the current state of the registration driver 40 or modify it.

The network service management server 12 includes a POP server 313 for email service. A request to read or download mail is directed to the POP server 313 if the client is attempting to access their e-mail without being registered. The POP server 313 limits the number of emails a client can send during a registration period. The POP server 313 counts the number of emails sent during the registration period. If the client exceeds a certain limit set by the administrator, the network service management server 12 will not permit any more emails to be sent by this client. This feature prevents the system from being used as a SPAM relay system. The registration period may be set in the registration driver 40.

The network service management server 12 includes a registration Web server 310, and a redirection Web server 314. The registration Web server 310 serves local content for the network service management server, which includes the registration Web pages, administrative Web pages, and configuration Web pages.

The registration Web pages serve as a client's portal to the services provided by the network service management server 12. This includes registering for access to the Internet. The client may choose different methods of authentication, including port based or access code based. For example, in the port based authorization model, fee information is determined based upon their assigned IP address. For example, in access code based authentication, fee is determined based upon access codes which clients enter. The access codes may include prepaid access code and location based access code as described below.

The administrative Web pages allow server administrators and staff to perform various tasks, including the checking current state of the registration driver, manual registration changes, modification of the settings of the components included in the network service management server 12, displaying of system health variables, displaying of billing information, and displaying and generating of access codes.

The redirection Web server 314 listens for http traffic on a special port. When the redirection Web server 314 receives an http request, it will send the client to the registration Web server 310.

The network service management server 12 includes a standard open-source DNS server 312 to handle their DNS requests.

As described above, the registration driver 40 maintains an original IP address, an assigned IP address, client MAC address, router MAC address and RAI MAC address. The registration driver 40 further includes timing parameters to allow fixed-length registration periods, as well as inactivity timeouts for unregistered clients. The timing parameters may include: a creation time, a registration time, a registration expiry, an entry expiry, a last used, and flags. The creation time parameter shows the time that the IP address was assigned this client. The registration time parameter shows the time that the client was registered for Internet access through the registration process. The registration expiry parameter shows the time that the registration is due to expire. The entry expiry parameter shows the time that the assigned IP address will be returned to the pool of free IP addresses. The last used parameter shows the last time there was traffic to/from the client system. The flags contain bit fields used to indicate the state and nature of a particular client (i.e. registered; DHCP; valid; permanent; etc.)

The registration driver 40 maintains pools of both assigned IP addresses and unassigned IP addresses. The registration driver 40 maintains address pools for clients in a Virtual Private Network (VPN).

As described above, the network service management server 12 provides multiple billing and payment options providing flexibility for MSOs and their customers, and has multiple features for registration/billing services. The network service management server 12 integrates with multiple billing systems, including cable account bills and property management billing systems in the hospitality industry.

The network service management server 12 may provide the following functionality or components for registration and billing services.

Property Management System 1 way (PMS1 way): The network service management server 12 has a PMS 1 way component for posting charges to a client folio in a local property, such as a guest folio in a hotel. The PMS 1 way component supports interfaces, such as Micros Fidelio, Hilton, Springer Miller, Bell HOBIC, HIS, Galaxy, MSI, Encore, Lodgistix, Hitachi HOBIC, System 21, Yesware, and Control.

The network service management server 12 integrates with PMS allowing the charges for high speed internet access to appear on the user's folio. The guest simply selects the service when registering and the network service management server ports the charges directly to the folio of the hotel guest room via the PMS. This ensures that charges for high speed internet access usage appear on the guest bill.

Property Management System 2 way (PMS 2 way): The network service management server 12 has a PMS 2 way component for interacting with the property PMS system to post charges to a guest folio and to retrieve information from the PMS to present further authentication mechanisms, retrieve and apply discounting. The PMS 2 way component supports interfaces, such as Micros Fidelio. The PMS 2 way integration allows group discounts and customization of greetings, while supplying the guest with on-line billing information. The PMS 2 way component pulls data from the PMS database.

This enables additional features such as:
Check In/Check Out Status: All traffic may be blocked until a hotel room has been checked in. This means that until a hotel guest has registered with the property, no one else (i.e., unauthorized user, a housekeeper, or property staff can use the service.
Folio Review: This feature allows the guests to view their current hotel charges outline.
Discount: This feature allows the property to apply discounts to Internet charges based on PMS settings.
Name Lookup: This feature allows the property to retrieve guest information from the PMS database. With this feature enabled, the property automatically customizes a registration page for each guest.
RADIUS (Remote Authentication Dial-In User Service) Support: The network service management server 12 has a RADIUS support component for supporting RADIUS functionality. The RADIUS support component authenticates and authorizes information sent to a RADIUS server on the Internet. The client is capable of having a central account for configuration.

The RADIUS support provides centralized account based authentication, permitting property owners the ability to offer brand-wide sales to major corporations and organizations.

RADIUS manages customer accounts through user IDs and passwords. The network service management server 12 acts as a RADIUS client node and forwards user IDs and passwords to the RADIUS server for authentication. If there are multiple network service management server sites across the same brand, this feature allows property managers to user the same authentication information (username/password) at all participating sites.

Credit Card Support: The network service management server 12 has a credit card support component for supporting credit card settlement for Internet usage. The client is allowed to pay for their Internet usage via their credit card. Once the credit card is authenticated by a third party authorization service, the client is granted Internet access. When configured for credit card authentication, the network service management server 12 routes credit information and charges securely to an Internet based transaction server for processing (such as Verisign, authorize.net). The network service management server 12 receives an approved or denied message in reply.

Pre-Paid Access Codes: The network service management server 12 has a pre-paid access codes component for generating pre-paid access codes to authorize clients for Internet service. Similar to a phone calling card, the client enters the pre-paid access code to gain Internet access. The pre-paid card has an associated amount of time the client can connect to the Internet.

Specific levels of service associated with the access code may be set up by blocks of time, service levels, bandwidth and/or type of IP address. Access codes are designed for environments where the user will pay for the service at a desk or counter and receive a specific level of service.

Users purchase an access code that is valid for predefined services and time. Once registered, a user is allowed to move from one room, or port to another. The pre-paid access codes component recognizes the user's unique MAC address and does not re-bill the user.

For example, for conference or meeting rooms, access codes are generated for each port preventing fraudulent use.

Location Based Access Codes: Properties may want to restrict access to a specific port, such as a port in a conference room, a business center or a lobby. The network service management server 12 supports such access restriction through location based access codes. A subscriber registers for service with an access code.

Multiple Registration Periods: The network service management server 12 offers multiple registration periods. The registration periods may be offered as options to a client requesting/registering for Internet service.

Multiple Service Classes: The network service management server 12 offers multiple service classes. The service classes, such as speed of service, public vs private IP assignment, connection times, are offered as options to a client requesting/registering for Internet service Byte Based Billing : The network service management server 12 allows properties to bill the usage of the network. The network service management server 12 tracks client usage and bills by the amount of actual network traffic they have consumed.

Time Based Billing: The network service management server l2 allows properties to bill the minute, hour, day, week, month, year or decade, whatever parameters the property desires. The network service management server 12 tracks the client connection time, which is similar to a long distance phone call. The client is charged by the number of minutes they are connected to the Internet. Alternatively, users may be charged incrementally on a per minute basis.

The network service management server 12 may also have functionalities to provide the following services.

Printing: The network service management server 12 offers a "driver-less" printing service. Clients using this feature select the service web page on the network service management server 12. They select the printing option. The system supports MS Office documents. Documents are uploaded to the network service management server 12, routed to a remote conversion server and returned to the server. The client has the option to preview the document before sending it to the printer. The property can charge a fee for the printing service.

Walled Garden (Free Sites): The network service management sever supports a free site list. Clients using the network service management server 12 are capable of accessing only the web sites in the "free site" list until they have registered for Internet access. This feature has a set of tools that the site administrator can add/remove web sites from the list.

Proxy Support: The network service management server 12 accommodates client browsers that have been configured to route their web requests through a proxy server. The network service management server 12 has administration tools for modifying proxy ports, such as adding new proxy ports. The network service management server 12 supports a plurality of proxy ports, such as (1080,3124,8000,8080), and further adds new proxy ports. Using the tools, the network service management server 12 offers seamless proxy support for client computers pre-configured with proxy ports enabled in their browsers.

VPN Support: The network service management server 12 supports Virtual Private Network (VPN). The VPN support permits client computers to connect to remote VPN services through the network service management server 12. Clients register for VPN service on network service management server 12. The clients may register for this service through the registration web pages. Once the network service management server 12 authenticates the clients, the client computers start their VPN client software and securely tunnel over the Internet back to their corporate network. All network traffic between the client computer and the remote VPN server is encrypted. The VPN traffic supported by the network service management server 12 include the traffic for Point-to-Point Tunneling Protocol (PPTP) and IP Security (IPSEC) protocols.

The above embodiments have been described using a cable modem network. The network service management server 12 also integrates with various vendors hardware in addition to cable modems.

Wireless Access Points: The network service management server 12 offers support for wireless access points. Generic wireless access points behave like a network hub. The network service management server 12 authenticates a client based on their MAC address. The network service management server 12 resolves location where the access point is connected to a managed switch.

Wireless Bridges: The network service management server 12 integrates proprietary wireless bridges, which resolves the MAC address of the wireless bridge. If the MAC address of a wireless bridge is available, the wireless bridge is "mapped" to a guest room number. Using the capability, the network service management server 12 determines where a client is connecting from, and having resolved the actual room a guest is connected to allows the network service management server 12 to bill directly to the guest's folio.

Figure 8:
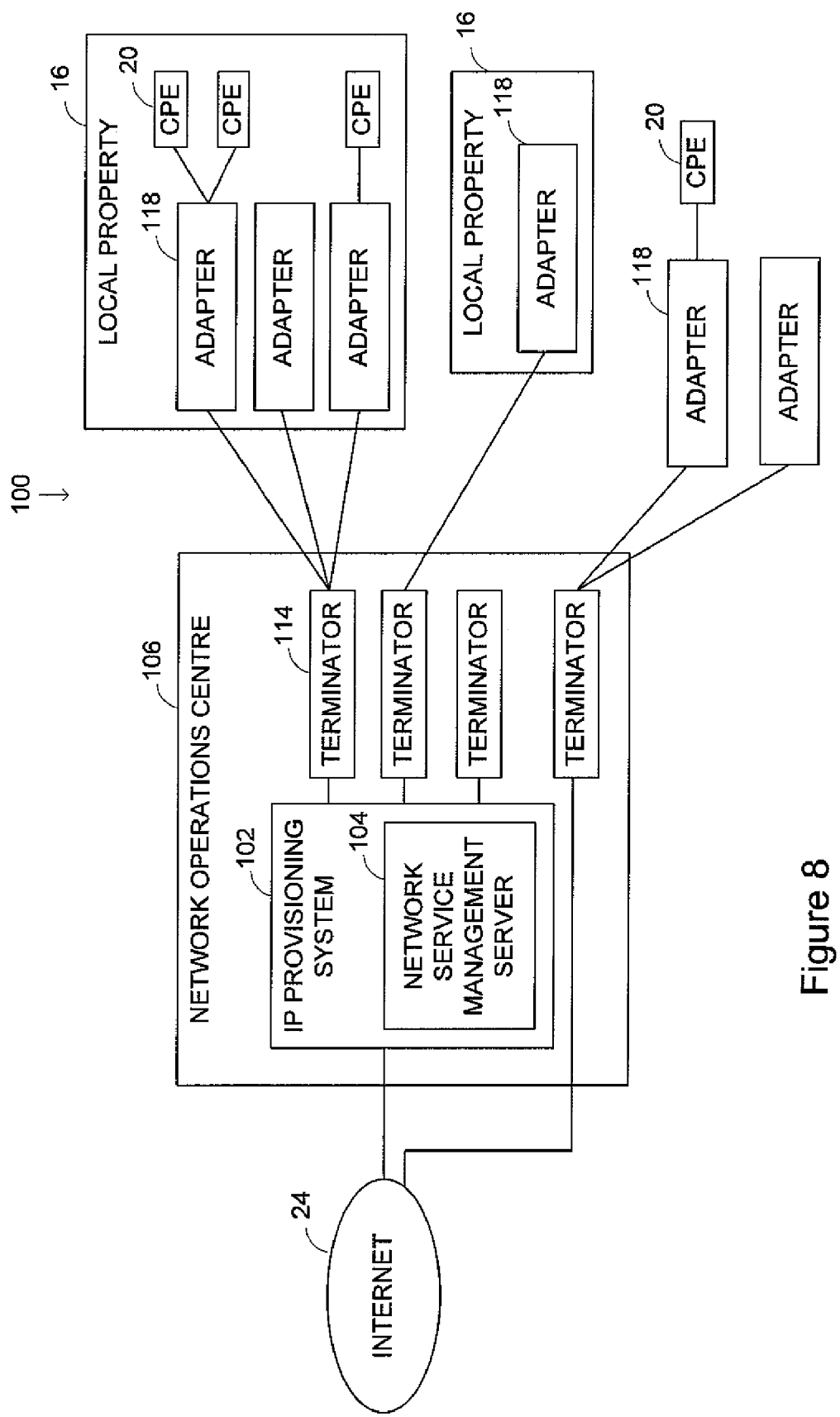
FIG. 8 is a block diagram showing another embodiment of the invention used in a different network.

The present invention may be applied to different networks operated by MSOs with appropriate modification. Different networks may comprise various network entities. An example of different MSO internal networks is shown in FIG. 8. The MSO internal network 100 comprises multiple network entities, including adapters which are capable of routing traffic from and to CPEs 20. The MSO internal network 100 are terminated with terminators 114 located in a network operating centre 106. The MSO network 100 may be Digital Subscriber Line (DSL) networks, or a network of satellites.

For example, when the MSO internal network 100 is a DSL network, the network includes one or more DSL modems used as adapters 118 and one or more DSL concentrators used as terminators 114. DSL modems and DSL concentrators correspond to cable modems and CMTSs in the cable modem network described above, respectively. A DSL concentrator provides network traffic collection and relay services, similar to a CMTS in a cable modem network. DSL concentrators may be Digital Subscriber Line Access Multiplexers (DSLAMs).

A network service management server 104, similar to network service management server 4 described above, integrates with the DSL concentrators and DSL modems. In the DSL network, DSL modems do not request IP addresses or request TFTP configuration files. Accordingly, the network service management server 104 queries the DSL concentrators to obtain information regarding DSL modems connected to the DSL concentrators, and CPEs connected to the DSL modems. The network service management server 104 also queries the DSL concentrators to determine to which DSL a CPE is connected, e.g., resolve the room/port/DSL modem location from which a guest is connecting his/her CPE. This is similar to querying a switch port to retrieve the switch and port a client is connected to. This switch/port map is then mapped to a physical room in the local property. The DSL concentrators may use a standard bridge MIB (RFC 1493), or other proprietary methods to track this information. The network service management server 104 may perform, when appropriate, client data collection, network provisioning, client authorization and/or routing in similar manners in a cable modem network as described above.

The embodiment described above may be implemented in hardware, software or in a combination of hardware and software. While particular embodiments of the present invention have been shown and described, changes and modifications may be made to such embodiments without departing from the true scope of the invention which is defined in the claims.

What is claimed is:

1. A network service management server for managing Internet services for a cable modem network, the network service management server comprising:

a registration driver provided at a selected location of the cable modem network having multiple cable modems and routing Cable Modem Termination Systems (CMTSs) for communicating with connected cable modems, the CMTSs being provided at the selected location and the cable modems being provided at remote locations outside the selected location, the registration driver for registering a client connecting to one of the cable modems;

an address assignment handler provided at the selected location of the cable modem network for assigning client Internet protocol (IP) address ranges and cable modem IP address ranges to each of the routing CMTSs using the registration driver, wherein the address assignment handler, in response to a client request, assigns to the client a client IP address from the client IP address ranges assigned to one of the routing CMTSs associated with the one of the cable modems to which the client is connected; and an information handler for handling information relating to Internet services for the client based on the assigned client address.

2. The network service management server as claimed in claim 1, wherein:

the registration driver registers the client based on the assigned IP address or MAC address.

3. The network service management server as claimed in claim 1, wherein:

the registration driver registers the client in association with information of a CMTS to which the client is connected; and the address assignment handler assigns to the client an IP address that is associated with the information of the CMTS to which the client is connected.

4. The network service management server as claimed in claim 1 further comprising:

a cable modem database for storing location information of a cable modem in association with a Media Access Control (MAC) address of the cable modem; and a location resolution handler for obtaining a cable modem MAC address from network traffic sent from or to a client connected to the cable modem, and resolving the location of the client based on the location information of the cable modem using the client IP address or MAC address.

5. The network service management server as claimed in claim 4 wherein:

the registration driver registers the client in association with a client IP address or client MAC address, and the location resolution handler is a Simple Network Management Protocol (SNMP) daemon that resolves the location of the client based on the client IP address assigned by the address assignment handler.

6. The network service management server as claimed in claim 4 wherein:

the internal network reflects one or more network entities which are routing devices; and the address assignment handler assigns to the client an address that includes information of one or more routing devices that the client traffic is routed.

7. The network service management server as claimed in claim 6 wherein:

the internal network includes one or more Dynamic Host Configuration Protocol (DHCP) relay modules; and the address assignment handler assigns to the client an address that reflects information of one or more DHCP relay modules through which the client traffic passes.

8. The network service management server as claimed in claim 4 wherein:

the internal network includes network entities which are bridging devices; and the address assignment handler assigns to the client an address that reflects information of bridged network entities through which the client traffic passes.

9. The network service management server as claimed in claim 4 wherein:

the information handler handles billing information for a client based on the location of the client as resolved by the location resolution handler.

10. The network service management server as claimed in claim 4 further comprising:

a cable modem provisioning handler for provisioning a cable modem; and a cable modem information handler for storing the provisioning information in the cable modem database.

11. The network service management server as claimed in claim 1 wherein:

the client has a fixed address that is used for a foreign network; and the network service management server further comprises an address translator for translating the fixed address to or from the assigned address.

12. A method of managing network services for a cable modem network, the method comprising the steps of:

registering, at a selected location of the cable modem network which is operated by a multi-system operator and having multiple cable modems and routing Cable Modem Termination Systems (CMTSs) for communicating with connected cable modems, a client connecting to one of the cable modems, the CMTSs being provided at the selected location and the cable modems being provided at remote locations outside the selected location;

assigning client Internet protocol (IP) address ranges and cable modem IP address ranges to each of the routing CMTSs using the registration driver;

assigning, in response to a client request, to the client an IP address from the client IP address ranges assigned to one of the routing CMTSs associated with the one of the network entities to which the client is connected; and handling information relating to network services for the client based on the assigned address.

13. The method as claimed in claim 12, wherein:

the registering step registers the client based on the assigned Internet Protocol (IP) address or Media Access Control (MAC) address.

14. The method as claimed in claim 12, wherein:

the registering step registers the client in association with information of one or more network elements through which the client is routed; and the assigning step assigns to the client an IP address that is associated with the information of the one or more network elements through which the client is routed.

15. The method as claimed in claim 12 further comprising the steps of:

storing location information of a cable modem in association with a assigned IP address of the cable modem;

obtaining a cable modem MAC address from network traffic sent from or to a client connected to the cable modem; and resolving the location of the client based on the location information of the cable modem using the client IP address or MAC address.

16. The method as claimed in claim 15, wherein:

the registering step registers the client in association with a client IP address or client MAC address, and the resolving step resolves the location of the client by a SNMP daemon based on the client IP address assigned by the assigning step.

17. The method as claimed in claim 15 wherein:

the assigning step assigns to the client an address that reflects information of the device through which the client is routed when one or more network entities are routing devices.

18. The method as claimed in claim 17 wherein:
the assigning step assigns to the client an address that reflects information of one or more DHCP relay modules through which the client traffic passes when the internal network includes one or more DHCP relay modules.

19. The method as claimed in claim 15 wherein:
the assigning step assigns to the client an address that reflects information of bridged network entities through which the client traffic passes when one or more network entities are bridging devices.

20. The method as claimed in claim 15 wherein:
the information handling step handles billing information for a client based on the location of the client as resolved by the location resolution handler.

21. The method as claimed in claim 12 wherein:
for a client having a fixed address that is used for a foreign network, translating the fixed address to or from the assigned address.

22. The method as claimed in claim 12 further comprising the steps of:
provisioning a network entity; and
storing the provisioning information in a network entity database.

23. A computer readable medium storing the instructions or statements for use in the execution in a computer of a method of managing network services for a cable modem network, the method comprising the steps of:
registering, at a selected location of the cable modem network which is operated by a multi-system operator and having multiple cable modems and routing Cable Modem Termination Systems (CMTSs) for communicating with connected cable modems, a client connecting to one of the cable modems, the CMTSs being provided at the selected location and the cable modems being provided at remote locations outside the selected location;
assigning client Internet protocol (IP) address ranges and cable modem IP address ranges to each of the routing CMTSs using the registration driver;
assigning, in response to a client request, to the client an IP address from the client IP address ranges assigned to one of the routing CMTSs associated with the one of the network entities to which the client is connected; and
handling information relating to network services for the client based on the assigned address.

* * * * *